United States Patent
Feng (10) Patent No.: US 11,971,729 B2
(45) Date of Patent: Apr. 30, 2024

(54) UNMANNED AERIAL VEHICLE CONTROL METHOD AND TERMINAL

(71) Applicant: AUTEL ROBOTICS CO., LTD., Guangdong (CN)

(72) Inventor: Yinhua Feng, Guangdong (CN)

(73) Assignee: AUTEL ROBOTICS CO., LTD., Guangdong (CN)

( * ) Notice: Subject to any disclaimer, the term of this patent is extended or adjusted under 35 U.S.C. 154(b) by 140 days.

(21) Appl. No.: 16/864,540

(22) Filed: May 1, 2020

(65) Prior Publication Data

US 2020/0272174 A1 Aug. 27, 2020

Related U.S. Application Data

(63) Continuation of application No. PCT/CN2018/086215, filed on May 9, 2018.

(30) Foreign Application Priority Data

Nov. 3, 2017 (CN) .......................... 201711070498.9

(51) Int. Cl.
*G05D 1/10* (2006.01)
*B64C 39/02* (2023.01)
(Continued)

(52) U.S. Cl.
CPC ........... *G05D 1/101* (2013.01); *B64C 39/024* (2013.01); *G01C 21/20* (2013.01); *G08G 5/0034* (2013.01);
(Continued)

(58) Field of Classification Search
CPC ..................................................... G05D 1/101
See application file for complete search history.

(56) References Cited

U.S. PATENT DOCUMENTS 10,112,712 B1 * 10/2018 Gentry .................. G05D 1/102
10,438,494 B1 * 10/2019 Hahn .................... G08G 5/0013
(Continued)

FOREIGN PATENT DOCUMENTS

CN     102854886 A     1/2013
CN     102854887 A     1/2013
(Continued)

OTHER PUBLICATIONS

NPL, Branco, Kalinka, Pelizzoni, Jorge et al., Tiriba-A New Model Approach of UAV based on Model Driven Development and Multiprocessors, IEEE, ICRA Communications, 978-1-61284-380-3/11/$26.00 @ 2011 IEEE (https://ieeexplore.ieee.org/stamp/stamp.jsp?tp=&arnumber=5980581).*

(Continued)

*Primary Examiner* — Jean Paul Cass (57) ABSTRACT

Embodiments of the present invention disclose an unmanned aerial vehicle (UAV) control method and a terminal. The method includes: determining, by a terminal before the terminal is connected to any UAV, location information of at least one waypoint according to a first setting operation of a user, and determining a flight path according to the location information of the at least one waypoint; storing, by the terminal, the flight path into a path record of a path database; and invoking, by the terminal after the terminal establishes a connection to a UAV, a first path record associated with the UAV from the path database, and sending the first path record to the UAV, to control the UAV to fly according to information in the first path record. The embodiments of the present invention can improve efficiency of a UAV in obtaining a flight path, and reduce power consumption of the UAV when no flight course task is executed.

6 Claims, 3 Drawing Sheets

(51) Int. Cl.
*G01C 21/20* (2006.01)
*G05D 1/00* (2006.01)
*G08G 5/00* (2006.01)

(52) U.S. Cl.
CPC ....... *G08G 5/0069* (2013.01); *B64U 2201/20* (2023.01)

(56) References Cited

U.S. PATENT DOCUMENTS

| | | | |
|---|---|---|---|
| 10,816,696 B2* | 10/2020 | Jin | G02F 1/0147 |
| 11,196,157 B1* | 12/2021 | Bonney | G08G 5/0082 |
| 2009/0132103 A1 | 5/2009 | Marty et al. | |
| 2010/0250022 A1* | 9/2010 | Hines | G05D 1/0094 |
| | | | 701/2 |
| 2010/0292871 A1* | 11/2010 | Schultz | G08G 5/045 |
| | | | 342/29 |
| 2017/0068253 A1* | 3/2017 | Hedrick | G01S 1/047 |
| 2017/0162064 A1 | 6/2017 | Ubhi et al. | |
| 2019/0197292 A1* | 6/2019 | Abeywardena | H04N 5/33 |
| 2019/0197646 A1* | 6/2019 | Prager | G06Q 50/30 |
| 2019/0339718 A1* | 11/2019 | Koch | G08G 5/0082 |
| 2020/0004272 A1* | 1/2020 | Pilskalns | G01S 19/43 |
| 2020/0026289 A1* | 1/2020 | Alvarez | G05D 1/0088 |
| 2020/0072624 A1* | 3/2020 | Kuzmanovic | G01C 21/3461 |
| 2020/0159252 A1* | 5/2020 | Giuffrida | H04N 7/185 |
| 2020/0310408 A1* | 10/2020 | Carper | B64C 39/024 |
| 2021/0031940 A1* | 2/2021 | Guida | B64C 15/00 |
| 2021/0086683 A1* | 3/2021 | Georgeson | G05D 1/042 |
| 2021/0319201 A1* | 10/2021 | Kale | G06F 18/25 |
| 2021/0383703 A1* | 12/2021 | Venkataramana | G05D 1/042 |
| 2021/0406538 A1* | 12/2021 | Lo | G06T 17/20 |
| 2022/0011783 A1* | 1/2022 | Groden | G05D 1/0016 |
| 2022/0019963 A1* | 1/2022 | Whitt | B64C 39/024 |

FOREIGN PATENT DOCUMENTS

| | | | | |
|---|---|---|---|---|
| CN | 104950907 A | 9/2015 | | |
| CN | 105867181 A | 8/2016 | | |
| CN | 106406351 A | 2/2017 | | |
| CN | 107861518 A | 3/2018 | | |
| EP | 3251108 A1 * | 12/2017 | ............ | H04W 12/08 |
| JP | 2017126101 A | 7/2017 | | |
| WO | WO-2017167229 A1 * | 10/2017 | ........... | B64C 39/024 |
| WO | WO-2018117776 A1 * | 6/2018 | ............ | B64C 39/02 |

OTHER PUBLICATIONS

NPL, Rosalie, Martin et al., UAV Multi-Level Swarms for Situational Management, DroNet'16, Jun. 26, 2016, Singapore, Singapore; DOI: http://dx.doi.org/10.1145/2935620.2935631 (2016)(hereinafter "Rosalie").*
Machine Translation of WO2018117776A1.*
International Search Report dated Jul. 4, 2018 PCT/CN2018/086215.
Third Chinese Office Action dated Dec. 23, 2019; Appln. No. 201711070498.9.

* cited by examiner

UNMANNED AERIAL VEHICLE CONTROL METHOD AND TERMINAL

This application is a continuation application of International Application No. PCT/CN2018/086215, filed on May 9, 2018, which claims priority of Chinese Patent Application No. 201711070498.9, filed on Nov. 3, 2017, which is incorporated herein by reference in its entirely.

BACKGROUND

Technical Field

The present application relates to the field of information technologies, and in particular, to an unmanned aerial vehicle (UAV) control method and a terminal.

Related Art

With the continuous development of UAV aerial photography technologies, increasing consumer UAVs are developed and produced, which are also becoming more popular. In flight of the UAV, a flight course task function is becoming more important. To be specific, the UAV receives a flight course task sent by a terminal, and flies according to the flight course task. The flight course task may be set by a user on the terminal.

At present, the user can set the flight course task for the UAV on the terminal only after the terminal is connected to the UAV. As a result, battery consumption of the UAV is increased during the user setting for the flight course task, which reduces the flight duration of the UAV, and causes a possible failure to complete the flight course task of the UAV.

SUMMARY

Embodiments of the present invention provide a UAV control method and a terminal, to reduce battery consumption of a UAV.

According to a first aspect, an embodiment of the present invention provides a UAV control method, including:

determining, by a terminal before the terminal is connected to any UAV, location information of at least one waypoint according to a first setting operation of a user, and determining a flight path according to the location information of the at least one waypoint;

storing, by the terminal, the flight path into a path record of a path database; and invoking, by the terminal after the terminal establishes a connection to a UAV, a first path record associated with the UAV from the path database, and sending the first path record to the UAV, to control the UAV to fly according to information in the first path record.

Optionally, the method further includes:

determining, by the terminal, flight parameter information corresponding to each of the at least one waypoint according to a second setting operation of the user; and the storing, by the terminal, the flight path into a path record of a path database includes:

binding, by the terminal, the flight path and the flight parameter information and storing the flight path and the flight parameter information into the path record of the path database.

Optionally, the method further includes:

determining, by the terminal, aerial vehicle information corresponding to the flight path according to a third setting operation of the user, the aerial vehicle information being used to uniquely identify a UAV; and the storing, by the terminal, the flight path into a path record of a path database includes:

binding, by the terminal, the flight path and the aerial vehicle information and storing the flight path and the aerial vehicle information into the path record of the path database.

Optionally, the invoking, by the terminal, a first path record associated with the UAV from the path database includes:

invoking, by the terminal, the first path record corresponding to aerial vehicle information of the connected UAV from the path database.

Optionally, before the invoking, by the terminal, a path record associated with the UAV from the path database, the method further includes:

displaying, by the terminal, at least one path record in the path database; and determining, by the terminal, the path record associated with the UAV according to a selection operation of the user on the at least one path record.

According to a second aspect, an embodiment of the present invention further provides a terminal, including: a memory, a processor, and a computer program stored in the memory, the processor implementing the following steps when executing the computer program:

determining, before the terminal is connected to any UAV, location information of at least one waypoint according to a first setting operation of a user, and determining a flight path according to the location information of the at least one waypoint;

storing the flight path into a path record of a path database; and invoking, after the terminal establishes a connection to a UAV, a first path record associated with the UAV from the path database, and sending the first path record to the UAV, to control the UAV to fly according to information in the first path record.

Optionally, the processor further implements the following steps when executing the program:

determining flight parameter information corresponding to each of the at least one waypoint according to a second setting operation of the user; and binding the flight path and the flight parameter information and storing the flight path and the flight parameter information into the path record of the path database.

Optionally, the processor further implements the following steps when executing the program:

determining aerial vehicle information corresponding to the flight path according to a third setting operation of the user, the aerial vehicle information being used to uniquely identify a UAV; and binding the flight path and the aerial vehicle information and storing the flight path and the aerial vehicle information into the path record of the path database.

Optionally, the processor further implements the following step when executing the program:

invoking the first path record corresponding to aerial vehicle information of the connected UAV from the path database.

Optionally, the processor further implements the following steps when executing the program:

before the invoking a first path record associated with the UAV from the path database, displaying at least one path record in the path database; and determining the path record associated with the UAV according to a selection operation of the user on the at least one path record.

According to a third aspect, an embodiment of the present invention provides a UAV control apparatus, including a function module configured to implement the method in the first aspect.

According to a fourth aspect, an embodiment of the present invention further provides a computer-readable storage medium, storing a computer-executable instruction used to perform the UAV control method.

In the embodiments of the present invention, the terminal sets and stores a path record according to an operation of a user before the terminal is connected to any UAV. After the terminal is connected to a UAV, the terminal may determine a path record associated with the UAV, and send the path record to the UAV, so that the UAV flies according to information in the path record. This can improve efficiency of a UAV in obtaining a flight path, and reduce power consumption of the UAV when no flight course task is executed.

DETAILED DESCRIPTION

The following describes the embodiments of the present application in detail with reference to the accompanying drawings.

Figure 1:
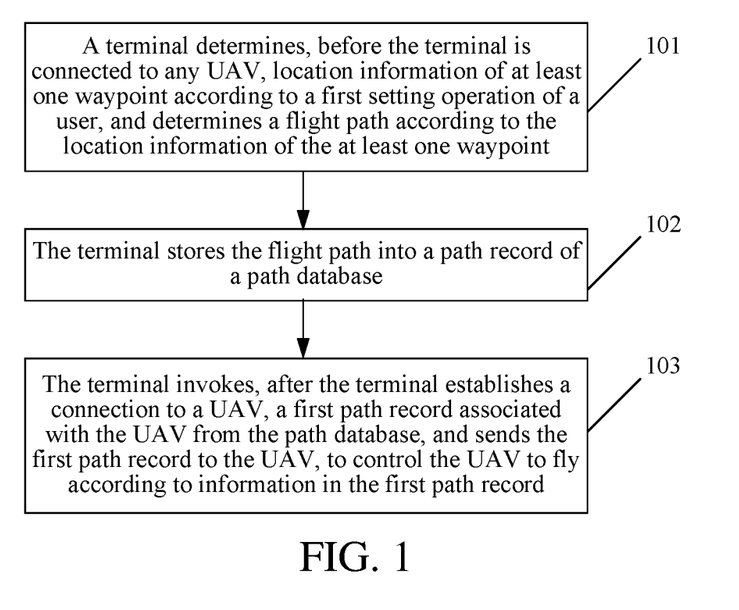
FIG. 1 is a flowchart of a UAV control method according to an embodiment of the present invention.

FIG. 1 is a flowchart of a UAV control method according to an embodiment of the present invention. The method may be performed by a terminal. The terminal may be a terminal including an Android operating system, an iOS operating system, a Windows operating system or other operating systems, for example, a smartphone, a mobile computer, a tablet computer, or a personal digital assistant (PDA). A UAV-related application may be installed in the terminal for communication with a UAV. For example, the application may receive flight information of a UAV, for example, a flight status and a flight parameter, by using the terminal. Alternatively, the application may send an instruction to the UAV by using the terminal, to control a flight status of the UAV. The terminal may be further connected to a remote control device configured to send a remote control instruction to the UAV, for example, to remotely control a flight direction of the UAV. Communication between the terminal and the UAV may be implemented directly or using the remote control device, which is not limited herein. A function of interaction with users may be configured on the terminal, which, for example, may be implemented by configuring hardware such as a touchscreen on the terminal, or by configuring software such as a human-computer interaction interface on the terminal. Certainly, the two manners may be combined, which is not limited herein.

As shown in FIG. 1, the method may include the following steps:

Step 101. A terminal determines, before the terminal is connected to any UAV, location information of at least one waypoint according to a first setting operation of a user, and determines a flight path according to the location information of the at least one waypoint.

For example, the terminal may display a map and receive a first setting operation of a user on the displayed map, to determine location information of at least one waypoint, and determine a flight path according to the location information of the at least one waypoint.

In an implementation, after displaying the map, the terminal detects one or more discrete waypoints selected by the user on the map, determines location information of the one or more discrete waypoints, and generates a flight path according to the location information of the discrete waypoints. For example, after displaying the map, the terminal detects a plurality of click/tap operations of the user on the map, determines a waypoint corresponding to each click/tap operation on the map, determines location information of the waypoint, and generates a flight path according to location information of discrete waypoints.

In another implementation, after displaying the map, the terminal detects one or more consecutive waypoints selected by the user on the map, determines location information of all or some of the consecutive waypoints, and generates a flight path according to the location information. For example, after displaying the map, the terminal detects a slide operation of the user on the map, and correspondingly generates a flight path according to an operation track of the slide operation and location information of at least one waypoint corresponding to the slide operation. Specifically, if the slide track of the slide operation is straight, location information of two waypoints, namely, a flight start point and end point, may be determined, and the generated flight path includes the location information of the two waypoints and a straight flight track. Therefore, the UAV may fly straight from the flight start point to the flight end point according to the flight path, or the like.

Certainly, the foregoing manners of generating a flight path are only examples, and this embodiment of the present application may further include other manners of generating a flight path, which is not limited herein.

Alternatively, the terminal may receive location information of a waypoint entered by the user, and generate a flight path according to the location information of the waypoint entered by the user, or the like, which is not limited herein.

The location information of the waypoint may include longitude information, latitude information and the like of the waypoint.

Optionally, after the terminal determines the at least one waypoint and the location information of the at least one waypoint according to the first setting operation, the terminal may further determining a corresponding flight mode according to the determined at least one waypoint.

A flight mode of a flight course task may include waypoint flight, hover flight, follow flight (for example, Follow Me) and the like. The waypoint flight means that the user draws a flight route track (a flight path) on the map and sets corresponding flight parameter information, and the UAV flies according to the set flight path. The hover flight means that the user sets a waypoint on the map and sets corresponding flight parameter information, and the UAV flies around the set waypoint. The follow flight means that the terminal (for example, a mobile phone) is used as a target task point, global positioning system (GPS) information of the terminal is received in real-time, corresponding flight parameter information is set, and the UAV flies following the terminal.

Herein, the terminal may determine, according to a quantity of set waypoints, that the flight mode is the waypoint flight or the hover flight.

For example, when only one waypoint is determined according to the first setting operation, the terminal may determine that the flight mode of the UAV is the hover flight. After determining the flight mode corresponding to the waypoint, the terminal may determine a flight path according to the location information of the waypoint, for example, generate at least one flight path on a spherical surface centered at the waypoint and having a radius of a distance.

For example, when a plurality of waypoints are determined according to the first setting operation, the terminal may determine that the flight mode of the UAV is the waypoint flight. If determining that the flight mode is the waypoint flight, the terminal may generate a flight path based on the flight mode and location information of the waypoints.

Optionally, in the foregoing implementations, after determining the flight mode, the terminal may ask the user whether the determined flight mode is correct, and may further generate a flight path if the user confirms that the determined flight mode is correct. Moreover, the generated flight path and the determined flight mode may be bound and stored. Certainly, the terminal may alternatively determine a flight mode according to an operation of the user, which is not limited herein.

Step 102. The terminal stores the flight path into a path record of a path database.

The path database may be located in a memory configured in the terminal or an external memory connected to the terminal, which is not limited in the present invention.

Optionally, if the terminal may be connected to a plurality of UAVs, the terminal may establish one or more path databases corresponding to the plurality of UAVs according to aerial vehicle information of the plurality of UAVs. For example, a corresponding dedicated path database may be established for each UAV. Alternatively, a common path database is established. Certainly, the terminal may use either of the dedicated path database and the common path database. The terminal may store a flight path into a path record of the dedicated path database, or the terminal may a flight path into a path record of the common path database, which is not limited herein. For example, if the terminal determines aerial vehicle information of a UAV corresponding to the flight path when determining the flight path, the terminal may store the flight path into a dedicated path database corresponding to the aerial vehicle information, which is not limited herein.

Step 103. The terminal invokes, after the terminal establishes a connection to a UAV, a first path record associated with the UAV from the path database, and sends the first path record to the UAV, to control the UAV to fly according to information in the first path record.

The terminal establishing a connection to a UAV may be the terminal directly establishing a connection to the UAV wirelessly, or may be the terminal establishing a connection to the UAV by using a UAV remote control, which is not limited herein. The terminal may exchange information with the UAV after the terminal establishes a connection to the UAV. The terminal may send the flight path associated with the UAV to the UAV, which simplifies setting operations of the user after the terminal is connected to the UAV, and reduces power consumption of the UAV when no flight course task is executed.

Optionally, in an embodiment, before step 102, the method may further include:

determining flight parameter information corresponding to each of the at least one waypoint according to a second setting operation of the user; and a specific implementation of step 102 may be binding, by the terminal, the flight path and the flight parameter information and storing the flight path and the flight parameter information into the path record of the path database.

The flight parameter information may include at least one of the following: flight speed information, flight height information, distance range information, low-power warning information, return information and the like.

The flight speed information may be flight speed information corresponding to the flight path, or may be flight speed information corresponding to a waypoint. Specifically, if determining that flight parameter information corresponding to each waypoint includes flight speed information, the terminal may determine flight speed information corresponding to the flight path according to the flight speed information corresponding to each waypoint, bind the flight path and the flight speed information and store the flight path and the flight speed information into the path record. Alternatively, if determining that flight parameter information respectively corresponding to some waypoints in the at least one waypoint includes flight speed information, the terminal may bind the flight path and the flight parameter information respectively corresponding to the some waypoints and store the flight path and the flight parameter information into the path record.

The flight height information may be flight height information corresponding to the flight path, or may be flight height information corresponding to a waypoint. For example, if determining that flight parameter information corresponding to each waypoint includes flight height information, the terminal may determine height information corresponding to the flight path according to the flight height information corresponding to each waypoint, bind the flight path and the flight height information and store the flight path and the flight height information into the path record. Alternatively, if determining that flight parameter information respectively corresponding to some waypoints in the at least one waypoint includes flight height information, the terminal may bind the flight path and the flight height information respectively corresponding to the some waypoints and store the flight path and the flight height information into the path record.

For the hover flight, the flight parameter information may further include the distance range information. The distance range information may be information about a radius away from a waypoint during the hover flight, or may be information about an area around one or more waypoints, which is not limited herein.

The low-power warning information may be a warning form for a low-power state of the UAV. For example, the terminal may display prompt information or emit warning sound.

The return information may include a return condition and return waypoint information. When a flight course task is completed or a control signal is lost or in the low-power state, the UAV automatically returns to a return waypoint and lands by using its vision system or a GPS record. The return waypoint may be a start point by default.

Optionally, after generating the flight path, the terminal may further display the flight path, and determine flight parameter information corresponding to the flight path according to a setting operation of the user, for example, a flight height and a flight speed corresponding to the flight path, which is not limited herein.

Optionally, in an embodiment, the method further includes:

determining aerial vehicle information corresponding to the flight path according to a third setting operation of the user, the aerial vehicle information being used to uniquely identify a UAV; and a specific implementation of step 102 may be binding, by the terminal, the flight path and the aerial vehicle information and storing the flight path and the aerial vehicle information into the path record of the path database.

The aerial vehicle information may include: identification information of the UAV, for example, one or a combination of a factory serial number of the UAV, a model of the UAV or a name of the UAV. The aerial vehicle information can be used to uniquely identify one UAV or one type of UAVs, which is not limited herein.

Correspondingly, a specific implementation of step 103 may be:

invoking, by the terminal, the first path record corresponding to aerial vehicle information of the connected UAV from the path database.

Optionally, if a path database corresponds to aerial vehicle information, the terminal may first determine a path database corresponding to the aerial vehicle information, for example, the dedicated path database. Then the terminal may invoke one or more flight paths in the path database. If the terminal invokes a plurality of flight paths from the path database, the terminal may select a flight path from the plurality of flight paths, or send the plurality of flight paths to the UAV. Specifically, the terminal may select a flight path from the plurality of flight paths according to an operation of the user, or the terminal may alternatively determine one or more flight paths according to information such as power to be consumed by the flight paths and remaining power of the UAV. If the terminal determines to send a plurality of flight paths to the UAV, it is determined that each flight path corresponds to one flight course task, and the terminal may indicate an execution sequence of the plurality of flight course tasks, or the terminal may indicate a flight sequence of the plurality of flight paths, which is not limited herein.

Optionally, in an embodiment, before the invoking, by the terminal, a path record associated with the UAV from the path database, the method further includes:

displaying, by the terminal, at least one path record in the path database; and determining, by the terminal, the path record associated with the UAV according to a selection operation of the user on the at least one path record.

The path database may store a plurality of path records. The terminal may display the plurality of path records in a form of a list for the user to select, to determine the path record associated with the UAV.

Figure 2:
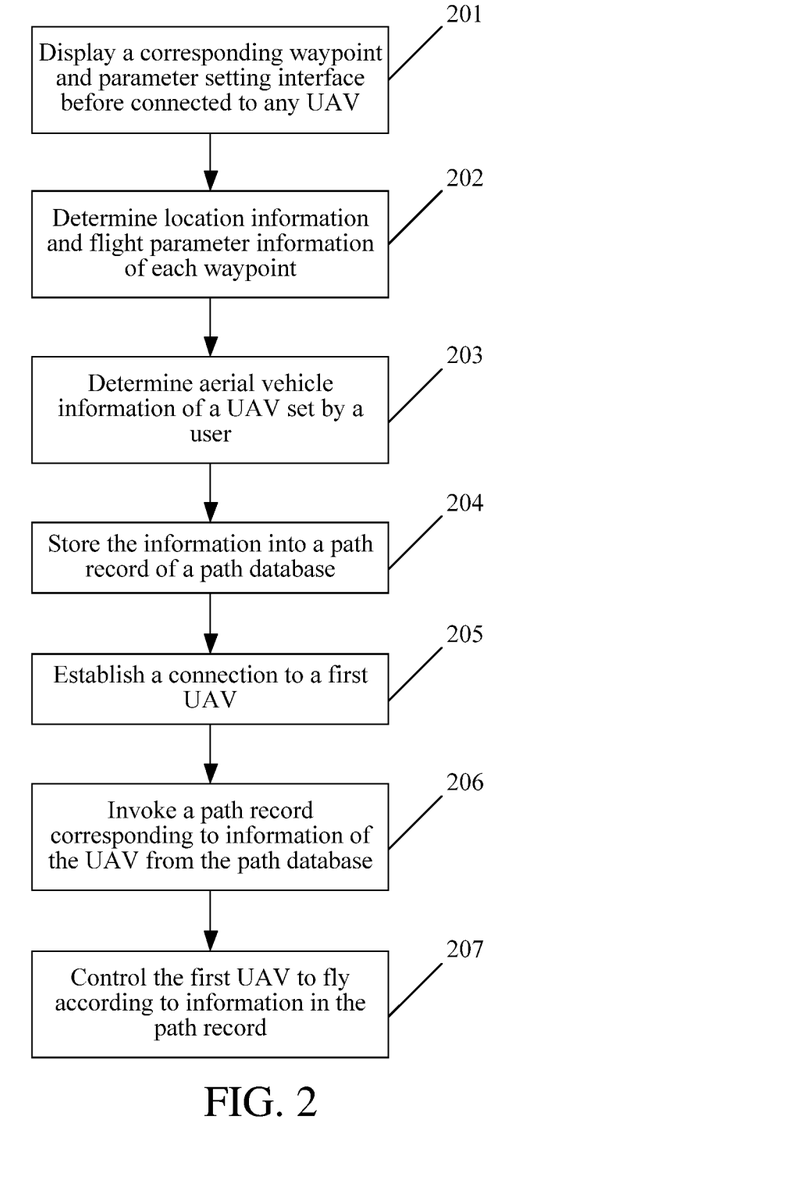
FIG. 2 is a flowchart of another UAV control method according to an embodiment of the present invention.

The following describes another UAV control method shown in FIG. 2 according to an embodiment of the present application by using an example that a flight mode is waypoint flight.

As shown in FIG. 2, the method includes the following steps:

Step 201. A terminal starts a UAV application, and displays a corresponding waypoint and parameter setting interface before the terminal is connected to any UAV.

The interface may display a map, so that a user may select a waypoint on the map.

Step 202. The terminal determines location information and flight parameter information of each waypoint according to setting operations of a user.

The flight parameter information may include one or more of a flight speed, a flight height, a distance range, low-power warning information, return information and the like.

Step 203. The terminal determines aerial vehicle information of a UAV set by the user.

The terminal may first provide a plurality of pieces of aerial vehicle information, and then determine, according to a selection operation of the user, aerial vehicle information set by the user, for example, a model of a UAV set by the user.

Step 204. The terminal determines a flight path according to the location information of each waypoint, binds the flight path, the flight parameter information and the aerial vehicle information, and stores them into a path record of a path database.

Step 205. The terminal establishes a connection to a first UAV.

Step 206. The terminal obtains aerial vehicle information of the connected first UAV, and invokes a path record corresponding to the aerial vehicle information from the path database. If invoking a plurality of path records, the terminal may display a list for the user to select.

Step 207. The terminal receives a path record selected by the user, and sends the path record to the first UAV, so that the first UAV may fly according to information in the path record, for example, fly over a plurality of waypoints in the flight path. Certainly, the first UAV may further execute another flight course task other than the flight. For example, the UAV may further perform photographing with a camera configured on the UAV or complete another flight course task when flying according to the flight path, which is not limited herein.

It should be noted that, for another flight mode, the terminal may refer to the foregoing execution manner, in which one or more pieces of information are stored into the path database according to setting operations of the user before the terminal is connected to any UAV, so that after the terminal establishes a connection to a UAV, stored information is sent to the UAV, and the UAV executes a flight course task according to the information.

For example, for the hover flight mode, before the terminal is connected to any UAV, the terminal may determine location information of a hover waypoint according to a setting operation of the user, and determine a flight path and flight parameter information corresponding to the waypoint, and may further determine aerial vehicle information of a UAV corresponding to the waypoint, and the like. The information may be bound and stored into a path record, so that after the terminal is connected to a second UAV, the terminal may invoke a path record associated with the second UAV, and send the path record to the second UAV. Certainly, in addition to the flight course task of hovering around the waypoint according to the flight path, the UAV may further execute another flight course task such as photographing.

For another example, for the follow flight mode, before the terminal is connected to any UAV, the terminal may determine aerial vehicle information of a UAV and flight parameter information corresponding to the aerial vehicle information according to setting operations of the user, and the like. The information is bound and stored into a path record, so that when determining that a UAV connected to the terminal executes a follow flight, the terminal sends a path record associated with the UAV to the UAV. Certainly, in addition to the flight course task of executing the follow flight mode based on waypoints according to the flight path, the UAV may further execute another flight course task such as photographing.

For example, a flight course task may include a flight path of a UAV. Optionally, the flight course task may further include a flight status parameter of the UAV during flight according to the flight path. Certainly, the flight course task may further include another task. For example, the UAV needs to execute a task such as photographing with a camera when flying according to the flight path.

An embodiment of the present invention further provides a terminal, which may be a terminal including an Android operating system, an iOS operating system, a Windows operating system or other operating systems, for example, a smartphone, a mobile computer, a tablet computer, or a PDA. The terminal is configured to implement the embodiments and the implementations. Details thereof are not repeated.

Figure 3:
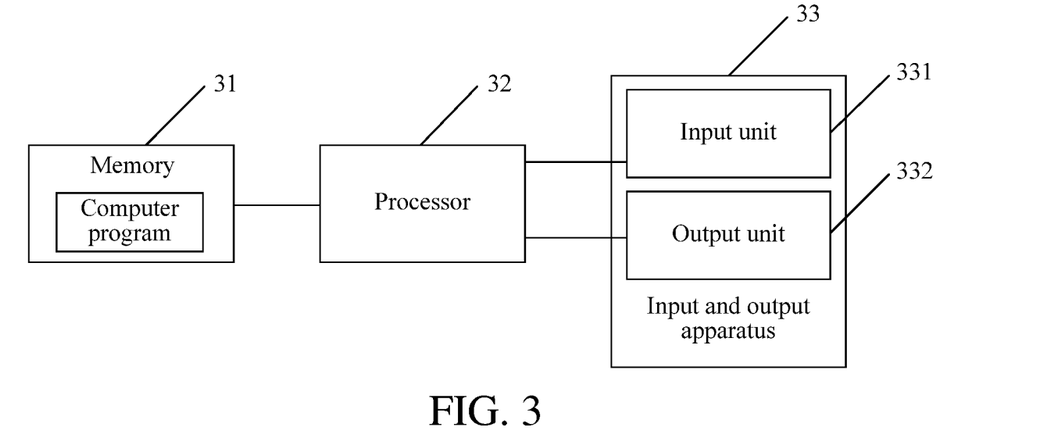
FIG. 3 is a schematic structural diagram of a terminal according to an embodiment of the present invention.

As shown in FIG. 3, the terminal in this embodiment of the present invention includes: a memory 31, a processor 32, an input and output apparatus 33 configured to interact with a user under control of the processor and a computer program stored in the memory 31 and executable on the processor.

The input and output apparatus 33 may include an input unit 331 and an output unit 332. The input unit 331 may include a touchscreen, a keyboard, a mouse, a microphone or the like, configured to receive an input operation of the user, including a setting operation, a selection operation, a confirmation operation and the like of the user. The output unit 332 may include a display screen, a speaker and the like, configured to output a prompt by using an image, sound or the like or provide an option for the user to select. In some embodiments, the input unit 331 and the output unit 332 may be integrated, for example, as a touchscreen.

The processor implements the following steps when executing the computer program:

determining, before the terminal is connected to any UAV, location information of at least one waypoint according to a first setting operation of a user, and determining a flight path according to the location information of the at least one waypoint;

storing the flight path into a path record of a path database; and invoking, after the terminal establishes a connection to a UAV, a first path record associated with the UAV from the path database, and sending the first path record to the UAV, to control the UAV to fly according to information in the first path record. The output unit 332 may be used to display a map, and the input unit 331 may be used to receive a first setting operation of a user on the map, which may be a click/tap operation, a slide operation or a keyboard input, to determine location information of at least one waypoint, and determine a flight path according to the location information of the at least one waypoint.

Optionally, the processor 32 further implements the following steps when executing the computer program:

determining flight parameter information corresponding to each of the at least one waypoint according to a second setting operation of the user; and binding the flight path and the flight parameter information and storing the flight path and the flight parameter information into the path record of the path database.

The output unit 332 may be used to display a location of each waypoint on the map and list information of selectable flight parameter information, and the input unit 331 may be used to receive a second setting operation of the user, which may be a selection operation on a drop-down list, a keyboard input operation or the like, to obtain flight parameter information corresponding to each waypoint. Optionally, the processor 32 further implements the following steps when executing the computer program:

determining aerial vehicle information corresponding to the flight path according to a third setting operation of the user, the aerial vehicle information being used to uniquely identify a UAV; and binding the flight path and the aerial vehicle information and storing the flight path and the aerial vehicle information into the path record of the path database.

The output unit 332 may be used to display one or more pieces of selectable aerial vehicle information, for example, may display a plurality of pieces of aerial vehicle information in a form of a list or a drop-down list, and the input unit 331 may be used to receive a third setting operation of the user, which may be a click/tap operation on an option in the list, a selection operation on the drop-down list or the like, to determine aerial vehicle information corresponding to the flight path.

Optionally, the processor 32 further implements the following step when executing the computer program:

invoking the first path record corresponding to aerial vehicle information of the connected UAV from the path database.

Optionally, the processor 32 further implements the following steps when executing the computer program:

before the invoking a first path record associated with the UAV from the path database, displaying at least one path record in the path database; and determining the path record associated with the UAV according to a selection operation of the user on the at least one path record.

The output unit 332 may be used to display at least one path record in the path database, for example, may display a plurality of path records in a form of a list or a drop-down list, and the input unit 331 may be used to receive a selection operation of the user on the at least one path record, which may be a click/tap operation on an option in the list, a selection operation on the drop-down list or the like, to determine a path record associated with the UAV. Certainly, the terminal may further include another apparatuses, for example, a communication apparatus, to implement a communication connection to the UAV. Other apparatuses, circuit structures or the like included in the terminal are not limited herein.

The memory 31 may include a volatile memory, such as a random access memory (RAM), a static random access memory (SRAM) or a double data rate synchronous dynamic random access memory (DDR SDRAM). The memory may alternatively include a non-volatile memory, such as a flash memory, a hard disk drive (HDD) or a solid state drive (SSD). The memory 31 may alternatively include a combination of the foregoing types of memories.

The memory may be an independent memory, or may be a memory in a chip (for example, a processor chip) or a module having a storage function.

The memory may store a computer program (for example, an application program or a function module), a computer instruction, an operating system, data, a database and the like. The memory may store them in different areas.

The processor 32 may be one or a combination of dedicated processors such as a central processing unit (CPU), a network processor (NP), a data processor, an image processor and a task processor.

The processor 32 may further include a hardware chip. The hardware chip may be an application-specific integrated circuit (ASIC), a programmable logic device (PLD) or a combination thereof. The PLD may be a complex programmable logic device (CPLD), a field-programmable logic gate array (FPGA), a generic array logic (GAL) or any combination thereof. Certainly, the processor may further include a hardware apparatus such as a single-chip microcomputer.

The processor and the memory in this embodiment of the present application may be connected by using a communication bus or in another manner, which is not limited herein.

An embodiment of the present invention further provides a UAV control apparatus, configured to implement the embodiments and the implementations. Details thereof are not repeated. As used blew, the term "module" may be software, hardware or a combination thereof for implementing the foregoing function.

Figure 4:
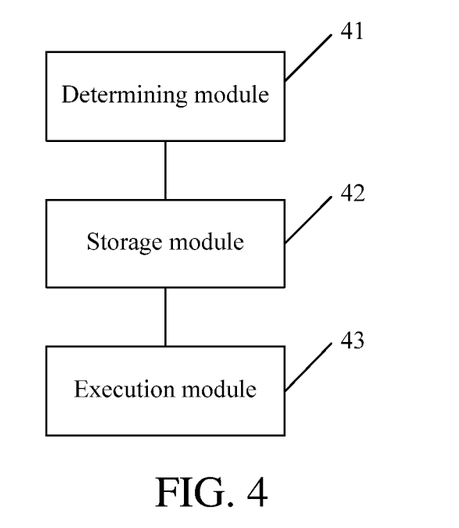
FIG. 4 is a schematic diagram of modular composition of a UAV control apparatus according to an embodiment of the present invention.

As shown in FIG. 4, the UAV control apparatus in this embodiment of the present invention includes:

a determining module 41, configured to determine, before the terminal is connected to any UAV, location information of at least one waypoint according to a first setting operation of a user, and determine a flight path according to the location information of the at least one waypoint;

a storage module 42, configured to store the flight path into a path record of a path database; and an execution module 43, configured to invoke, after the terminal establishes a connection to a UAV, a first path record associated with the UAV from the path database, and send the first path record to the UAV, to control the UAV to fly according to information in the first path record.

Optionally, the determining module 41 is further configured to determine flight parameter information corresponding to each of the at least one waypoint according to a second setting operation of the user; and the storage module 42 is further configured to bind the flight path and the flight parameter information and store the flight path and the flight parameter information into the path record of the path database.

Optionally, the determining module 41 is further configured to determine aerial vehicle information corresponding to the flight path according to a third setting operation of the user, the aerial vehicle information being used to uniquely identify a UAV; and the storage module 42 is further configured to bind the flight path and the aerial vehicle information and store the flight path and the aerial vehicle information into the path record of the path database.

The execution module 43 is configured to invoke the first path record corresponding to aerial vehicle information of the connected UAV from the path database.

Optionally, the apparatus further includes:

a display module, configured to display at least one path record in the path database; and the determining module 41 is further configured to determine the path record associated with the UAV according to a selection operation of the user on the at least one path record.

An embodiment of the present invention further provides a computer-readable storage medium, storing a computer-executable instruction used to perform the UAV control method.

In this embodiment, the computer-readable storage medium may include, but is not limited to, a medium such as a USB flash drive, a read-only memory (ROM), a RAM, a removable hard disk, a magnetic disk or an optical disc that can store program code.

Although the embodiments of the present invention are disclosed above, the content is only implementations adopted to facilitate understanding of the present invention. Any person skilled in the art may make any modification and change to the form and details of implementation, without departing from the spirit and scope disclosed in the present invention.

What is claimed is:

1. An unmanned aerial vehicle (UAV) control method, comprising:

determining, by a terminal when the terminal is not connected to any UAV, starting a UAV application, and displays a corresponding waypoint and parameter setting interface; location information of at least one waypoint according to a first setting operation of a user, and determining a flight path according to the location information of the at least one waypoint; and determining penal vehicle information corresponding to the flight oath according to a third setting operation of the user, the aerial vehicle information being used to uniquely identify a UAV;

storing, by the terminal, the flight path into a path record of a path database;

binding, by the terminal, the flight path and the aerial vehicle information and storing the flight path and the aerial vehicle information into the path record of the path database; and invoking, by the terminal after the terminal establishes a connection to a UAV, a first path record associated with the UAV from the path database, and sending the first path record to the UAV, to control the UAV to fly according to information in the first path record; invoking the first at record corresponding to aerial vehicle information of the connected UV from the path database;

before the invoking, by the terminal, a path record associated with the UAV from the path database, the method further comprises:

displaying by the terminal, at least one path record in the path database: and determining, by the terminal, the path record associated with the UAV according to a selection operation of the user on the at least one path record.

2. The control method according to claim 1, further comprising:

determining, by the terminal, flight parameter information corresponding to each of the at least one waypoint according to a second setting operation of the user; and the storing, by the terminal, the flight path into a path record of a path database comprises:

binding, by the terminal, the flight path and the flight parameter information and storing the flight path and the flight parameter information into the path record of the path database.

3. A terminal, comprising: a memory, a processor, and a computer program stored in the memory, the processor implementing the following steps when executing the computer program:

determining, when the terminal is not connected to any UAV, starting a UAV application, and displays a corresponding waypoint and parameter setting interface; location information of at least one waypoint according to a first setting operation of a user, and determining a flight path according to the location information of the at least one waypoint; and determining aerial vehicle information corresponding to the flight path according to a third setting operation of the user, the aerial vehicle information being used to uniquely identify a UAV;

storing the flight path into a path record of a path database;

binding, by the terminal, the flight path and the aerial vehicle information and storing the flight path and the aerial vehicle information into the path record of the path database; and invoking, after the terminal establishes a connection to a UAV, a first path record associated with the UAV from the path database, and sending the first path record to the UAV, to control the UAV to fly according to information in the first path record;

invoking the first path record corresponding to aerial vehicle information of the connected UAV from the path database, before the invoking, by the terminal, a path record associated with the UAV from the path database, the steps further comprises:

displaying, by the terminal, at least one path record in the path database; and determining, by the terminal, the path record associated with the UAV according to a selection operation of the user on the at least one path record.

4. The terminal according to claim 3, wherein the processor further implements the following steps when executing the computer program:

determining flight parameter information corresponding to each of the at least one waypoint according to a second setting operation of the user; and binding the flight path and the flight parameter information and storing the flight path and the flight parameter information into the path record of the path database.

5. A non-transitory computer-readable storage medium, storing a computer-executable instruction used to determine, by a terminal when the terminal is not connected to any UAV, start a UAV application, and displays a corresponding waypoint and parameter setting interface; location information of at least one waypoint according to a first setting operation of a user, and determining a flight path according to the location information of the at least one waypoint; and determining aerial vehicle information corresponding to the flight path according to a third setting operation of the user, the aerial vehicle information being used to uniquely identify a UAV;

store, by the terminal, the flight path into a path record of a path database;

bind, by the terminal, the flight path and the aerial vehicle information and storing the flight path and the aerial vehicle information into the path record of the path database; and invoke, by the terminal after the terminal establishes a connection to a UAV, a first path record associated with the UAV from the path database, and sending the first path record to the UAV, to control the UAV to fly according to information in the first path record; invoke the first path record corresponding to aerial vehicle information of the connected UAV from the path database, wherein before the stored computer-executable instruction is further used to invoke, by the terminal, a path record associated with the UAV from the path database, the stored computer-executable instruction is further configured to:

display, by the terminal, at least one path record in the path database; and determine, by the terminal, the path record associated with the UAV according to a selection operation of the user on the least one path record.

6. The non-transitory computer-readable storage medium according to claim 5, wherein the stored computer-executable instruction is further used to:

determine, by the terminal, flight parameter information corresponding to each of the at least one waypoint according to a second setting operation of the user; and the stored computer-executable instruction is further used to store, by the terminal, the flight path into a path record of a path database comprises:

the stored computer-executable instruction is further used to bind, by the terminal, the flight path and the flight parameter information and storing the flight path and the flight parameter information into the path record of the path database.

\* \* \* \* \*